Oct. 17, 1933.  F. NOLLER  1,930,724
ELECTRICAL CONDENSER
Filed Nov. 18, 1931
FIG.-1
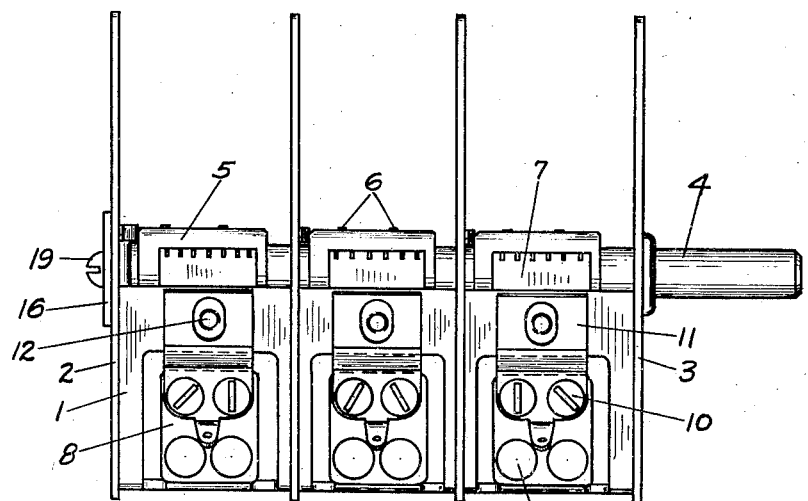
FIG.-2
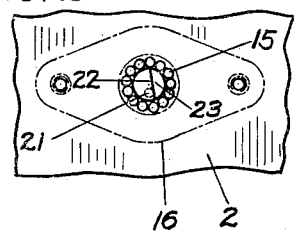
FIG.-3
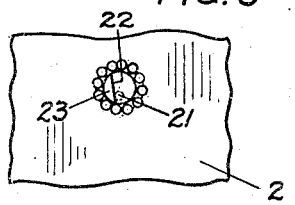
FIG.-5    FIG.-4
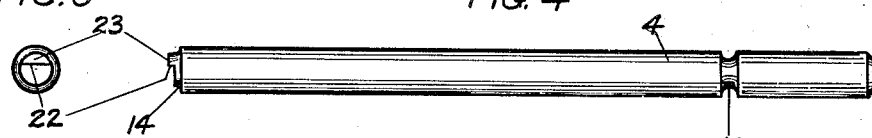
FIG.-7    FIG.-6
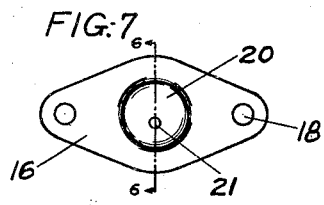   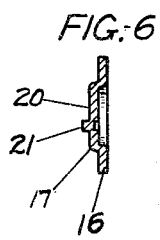   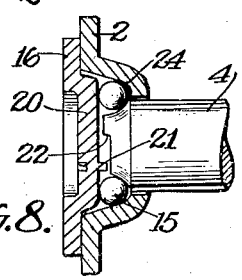
FIG.8.
INVENTOR
FRIEDRICH NOLLER
BY HIS ATTORNEY
A. D. T. Libby Patented Oct. 17, 1933

1,930,724

UNITED STATES PATENT OFFICE 1,930,724

ELECTRICAL CONDENSER

Friedrich Noller, Camden, N. J., assignor to Radio Condenser Company, Camden, N. J.

Application November 18, 1931
Serial No. 575,910

3 Claims. (Cl. 175—41.5)

This invention relates to details of construction of an electrical condenser.

In Cramer et al. Patent 1,757,357, there are shown and described ways and means for stopping the arcuate movement of the rotor of the condenser as it is turned by its operating shaft. Said means comprises an insulator preferably in the form of a thin strip positioned in one of the groups of condenser plates so as to be engaged by parts of the other group of plates as the two are relatively moved to the position of maximum capacity. The other stop is some part or member of the frame.

My improvement is directed to stop means for the rotor which does not require any insulator and does not enter into the construction of either the stator or the rotor group of plates, leaving them to be assembled without the necessity of assembling therewith any special insulating strip, or without making any special design of either stator or rotor group of plates.

It is therefore the principal object of my invention to provide stop means for the moving element of the condenser which is entirely independent of the stator and rotor group of plates, and one that is very cheap to manufacture and incorporate in the construction of the condenser.

My invention will be readily understood by reference to the annexed drawing wherein:

Figure 1 illustrates a side elevation of a three-gang condenser having a high shield between the various units of the gang.

Figure 2 is a fragmentary view of the left-hand end-plate shown in Figure 1, with one of the bearing elements removed, and with the rotor shaft in one of the stop positions, the stop itself being shown in dotted line.

Figure 3 is a view similar to Figure 2, but with the rotor shaft in its other stop position.

Figure 4 is a view of the rotor shaft as shown in the gang condenser of Figure 1.

Figure 5 is a left-hand end-view of Figure 4.

Figure 6 is a section on the line 6—6 of Figure 7.

Figure 7 is a plan view of the bearing plate carrying one of the stop members.

Figure 8 is a sectional view on an enlarged scale through the left-hand end bearing of the condenser, the shaft 4 being in the position indicated in Figure 4.

In the drawing, wherein like numbers refer to corresponding parts in the various views, I have chosen to illustrate my improvement in connection with a three-gang condenser, the frame 1 having end-plates 2 and 3 carrying a shaft 4. Mounted on the shaft 4, are sleeves 5 which may be fastened to the shaft in any satisfactory manner as by set screws 6. The sleeves 5 carry the rotor plates, the outer ends of which are fastened together by tie-bars 7. As indicated in Figure 1, the rotor group of plates is fully enmeshed with the group of stator plates carried on the frame 1 by insulators 8, all as shown and described in Cramer Patent 1,800,719; that is to say, one end of the insulator is fastened to part of the frame in any satisfactory manner as by rivets 9, while the other end of the insulator 8 is fastened to the tie-bars of the stators by screws 10, which also act to carry trimming condenser plate 11.

This trimmer plate 11 is adjusted by means of an adjusting screw (not shown) which enters a screw-threaded hole 12 in the frame 1. The rotor shaft 4 has a bearing race 13 formed directly therein to receive anti-friction members in the shape of balls. The opposite end of the shaft 4 is provided with an end-race 14 to receive balls 15, all as shown in Cramer Patent 1,800,719. The end member 2 has an opening for the end of the shaft, but immediately adjacent this opening, the material of the end member is expanded to form an opening or recess around, but materially larger than the diameter of the shaft-end, and the balls 15 are held against the race 14 and the race 24 formed in the expanded part of end member 2 by a bearing or cover plate 16 which is formed with a race 17 located on the outer edge or periphery of the projecting part 20 to cooperate with the end-race 14 in the shaft 4.

The plate 16 is provided with a plurality of holes 18 to receive screws 19 holding it in position on the end-plate 2. That part or boss 20 of the plate 16 which is formed outwardly to provide the race 17 extends into an opening or recess in the end-plate 2 and has a projection 21 preferably formed integral with that portion 20 of the plate 16, and this projection 21 is adapted to cooperate with the edge 22 of the lug 23 formed on the end of the shaft 4 immediately adjacent the end-race 14. As will be seen from Figure 2, when the rotor shaft 4 is turned so that the groups of rotor plates are in full engagement with the groups of stator plates, the projection 21 engages one end of the surface 22 of the lug 23 as indicated in Figure 2. When the shaft 4 is turned so that the rotors are in the zero capacity position of the condenser, the lug 23 is in the position shown in Figure 3, and the opposite end of the edge 22 will engage the stop 21 on the cover plate 16.

Thus it will be seen that I have arranged stop parts for the rotor structure entirely independent of both the rotor and stator groups of plates, and stop parts that can be cheaply manufactured, as the projection 21 is put in at the same time that the portion 22 is formed outwardly to form the race 17 in the cover plate 16; and the lug 23 can be made by a very simple milling operation on the end of the shaft 4.

While I have shown my improvement in connection with a three-gang condenser, it is to be understood that it may be utilized in a single unit or a multiple unit condenser.

Having thus described my invention, what I claim is:

1. In an electrical condenser having a frame with end members one of which has a recess therein for a race member and at least one group of stator plates supported by said frame, and a rotor shaft carrying at least one group of rotor plates, said shaft having a bearing race formed therein intermediate its ends, and a cooperating bearing race carried by the other of said end members with anti-friction members in said races, and a second bearing race formed on one end of said shaft, a detachable plate carried by said first mentioned end member and having a part projecting into said recess, the inner surface of said projecting part being formed to cooperate with said shaft-end bearing-race; rotatable stop means for said shaft comprising, a lug in the form of an integral segment of the shaft-end adjacent said end-race, and a projection on said projecting part of said detachable plate extending toward said shaft-end and in the path of movement of the edge of said lug segment.

2. In an electrical condenser having a frame with end bearing members, one of which has an opening therein to pass the end of the condenser shaft, the material of the end member being expanded immediately adjacent the shaft opening to form a recess around but materially larger than the end of the shaft, said frame carrying fixed and movable plate elements, the latter elements being carried on a shaft supported in said end bearing members; means for stopping the rotating movement of the shaft to fix the maximum and minimum capacity positions of the movable elements, said means comprising a lug on the extremity of said shaft, and a plate on said one end-member adjacent the lug on the shaft, said one end-member having a recess therein, said plate having a boss extending into said recess and having a projection extending into the path of movement of said lug for both directions of rotation of the shaft.

3. In an electrical condenser having a frame with end members, one of which has a recess therein for a race member and at least one group of stator plates supported by said frame, and a rotor shaft carrying at least one group of rotor plates, said shaft having a bearing race formed therein intermediate its ends, and a cooperating bearing race carried by the other of said end members with anti-friction members in said races, a second bearing race formed at the extremity of said shaft, a plate carried by the first one of said end members and extending over said recess therein, and having a part formed to cooperate with said shaft extremity bearing race; rotatable stop means for said shaft comprising, a lug in the form of an integral segment of the shaft end adjacent said end race, and an integral projection from a part of the plate extending toward said shaft end and in the path of movement of the edge of said lug segment.

FRIEDRICH NOLLER.